(12) United States Patent
Kiyohara

(10) Patent No.: US 10,459,268 B2
(45) Date of Patent: Oct. 29, 2019

(54) DISPLAY DEVICE

(71) Applicant: Mitsubishi Electric Corporation, Tokyo (JP)

(72) Inventor: Toru Kiyohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/921,698

(22) Filed: Mar. 15, 2018

(65) Prior Publication Data

US 2018/0292702 A1 Oct. 11, 2018

(30) Foreign Application Priority Data

Apr. 6, 2017 (JP) ................................. 2017-075656

(51) Int. Cl.
*G02F 1/1333* (2006.01)
*G02F 1/1368* (2006.01)

(52) U.S. Cl.
CPC ...... *G02F 1/133308* (2013.01); *G02F 1/1368* (2013.01); *G02F 2001/133317* (2013.01); *G02F 2001/133331* (2013.01)

(58) Field of Classification Search
CPC ................................................ G02F 1/133308
See application file for complete search history.

(56) References Cited

U.S. PATENT DOCUMENTS

| 2007/0040961 | A1* | 2/2007 | Lee ....................... H01J 61/305 |
| | | | 349/70 |
| 2009/0103002 | A1 | 4/2009 | Enomoto | |
| 2015/0277185 | A1* | 10/2015 | Nam ................. G02F 1/133512 |
| | | | 349/58 |

FOREIGN PATENT DOCUMENTS

| JP | H10-206828 A | 8/1998 |
| JP | 2009-098558 A | 5/2009 |

* cited by examiner

*Primary Examiner* — Joseph L Williams
*Assistant Examiner* — Jacob R Stern
(74) *Attorney, Agent, or Firm* — Studebaker & Brackett PC

(57) ABSTRACT

The object is to provide a technique capable of preventing, in a display device, bubbles from being trapped between a protective plate or a touch panel and a display panel and occurrence of display inhomogeneity. The display device includes a display panel, a backlight unit, a cushion serving as a support, and a first frame. The first frame includes: an opening through which the backlight unit is seen; a sidewall covering side surfaces of the backlight unit to form the opening; a panel facing portion extending from the sidewall toward the opening side to cover an end portion of the backlight unit; and a protruding portion protruding from the panel facing portion toward the display panel side. The cushion is disposed on the panel facing portion. The protruding portion is thinner than the cushion. A predetermined clearance is created between the tip of the protruding portion and the display panel.

4 Claims, 3 Drawing Sheets

F I G. 2
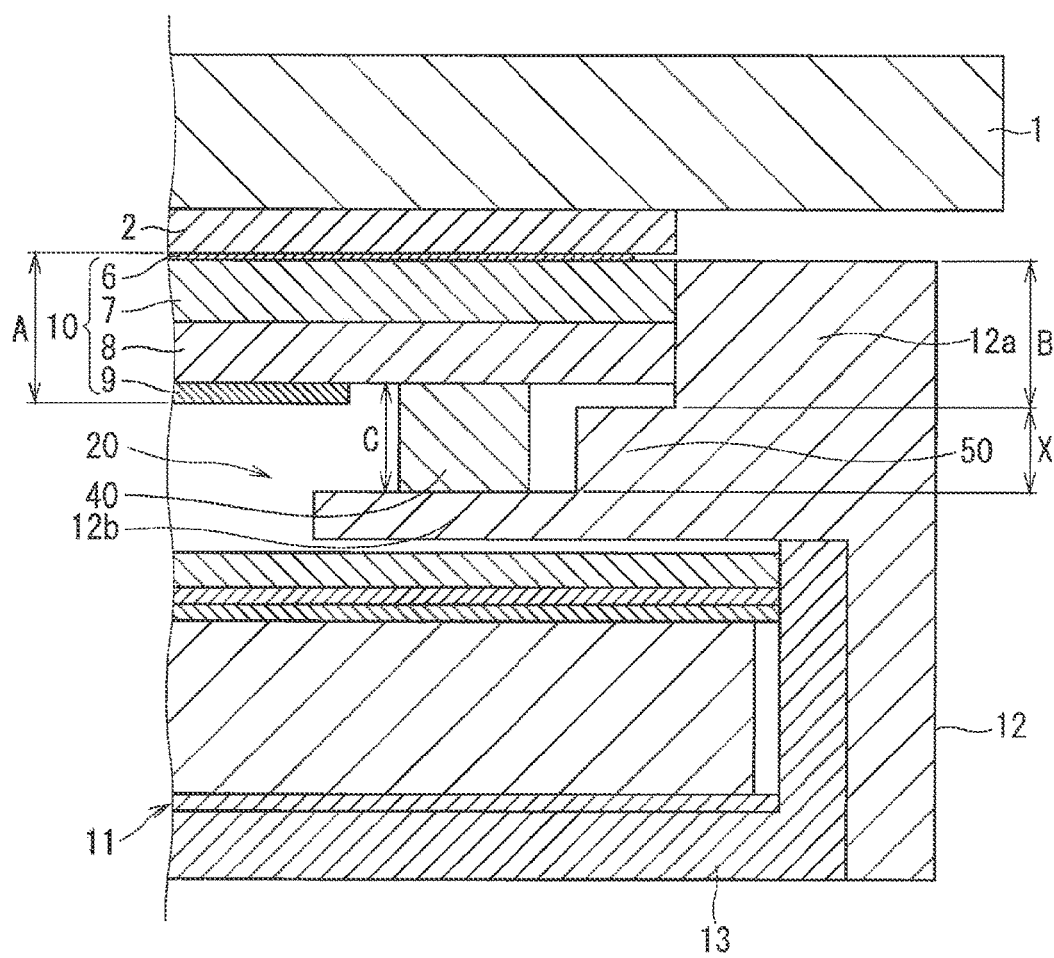

DISPLAY DEVICE

BACKGROUND OF THE INVENTION

Field of the Invention

The present invention relates to a display device including a display panel.

Description of the Background Art

In display devices each including a display panel with liquid crystals in an in-plane switching mode or a fringe-field switching mode, liquid crystal molecules disposed inside the display device are dispersed with application of stress to a portion of the display panel. This causes light emission to improper direction, which results in display inhomogeneity. The display devices each including the display panel in the in-plane switching mode or the fringe-field switching mode adopt a structure in which a cushion is disposed on a frame of a backlight unit to prevent the display inhomogeneity. This structure prevents a load from being applied to the display panel because the cushion absorbs the stress.

Conventionally, a spacer made of an elastic material has been inserted between the display panel and the frame of the backlight unit to prevent, for example, a foreign matter from entering in joining the display panel and the backlight unit. Examples of the material of the spacer include resins such as silicone and urethane, and expanded rubber.

For example, Japanese Patent Application Laid-Open No. H10-206828 discloses a technique of inserting a ring-shaped spacer into a spacer-insertion groove formed into a mold to prevent grime from entering between a liquid-crystal display panel and a backlight. In addition, Japanese Patent Application Laid-Open No. 2009-98558 discloses a technique of disposing a spacer to cover a clearance between a liquid-crystal display panel, a driving circuit board, and a middle frame to prevent a foreign matter from entering.

As seen in recent display devices, for example, a protective plate or a touch panel which is made of glass or transparent plastic is sometimes affixed to a display panel with a transparent resin. In a method for supporting a display panel on a backlight using an elastic component such as a cushion or a spacer as in the techniques of Japanese Patent Applications above, the elastic component is compressed to cause a significant change in the position of the display panel. Thus, the pressing pressure for affixing the protective plate or the touch panel becomes insufficient. As a result, the display devices have problems such as bubbles trapped between the protective plate or the touch panel and the display panel, and occurrence of display inhomogeneity because the protective plate or the touch panel is not uniformly affixed to the display panel.

SUMMARY

The object of the present invention is to provide a technique capable of preventing, in a display device, bubbles from being trapped between a protective plate or a touch panel and a display panel and occurrence of display inhomogeneity.

The display device according to the present invention includes a display panel, a backlight unit, a support made of an elastic material, and a frame-shaped frame. The backlight unit is disposed opposite to a display surface of the display panel. The support supports the display panel and the backlight unit in between. The frame holds a front portion and side portions of the backlight unit. The frame includes (i) an opening through which the backlight unit is seen, (ii) a sidewall covering side surfaces of the backlight unit to form the opening, (iii) a panel facing portion extending from the sidewall toward the opening side to cover an end portion of the backlight unit, and (iv) a protruding portion protruding from the panel facing portion toward the display panel side. The support is disposed on the panel facing portion. The protruding portion is thinner than the support. A predetermined clearance is created between a tip of the protruding portion and the display panel.

The support is disposed on the panel facing portion. The protruding portion is thinner than the support. A predetermined clearance is created between the tip of the protruding portion and the display panel. When the protective plate or a touch panel is affixed to the front surface of the display panel, the protruding portion supports the display panel with the support compressed. Thus, the pressing pressure little changes the position of the display panel. Consequently, it is possible to prevent any bubbles from being trapped between the protective plate or the touch panel and the display panel. With prevention of the trapping of bubbles, the protective plate or the touch panel can be uniformly affixed to the display panel, which can prevent occurrence of display inhomogeneity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a cross section of an end portion of the display device according to Embodiment 1.

DESCRIPTION OF THE PREFERRED EMBODIMENTS

Embodiment 1

Figure 1:
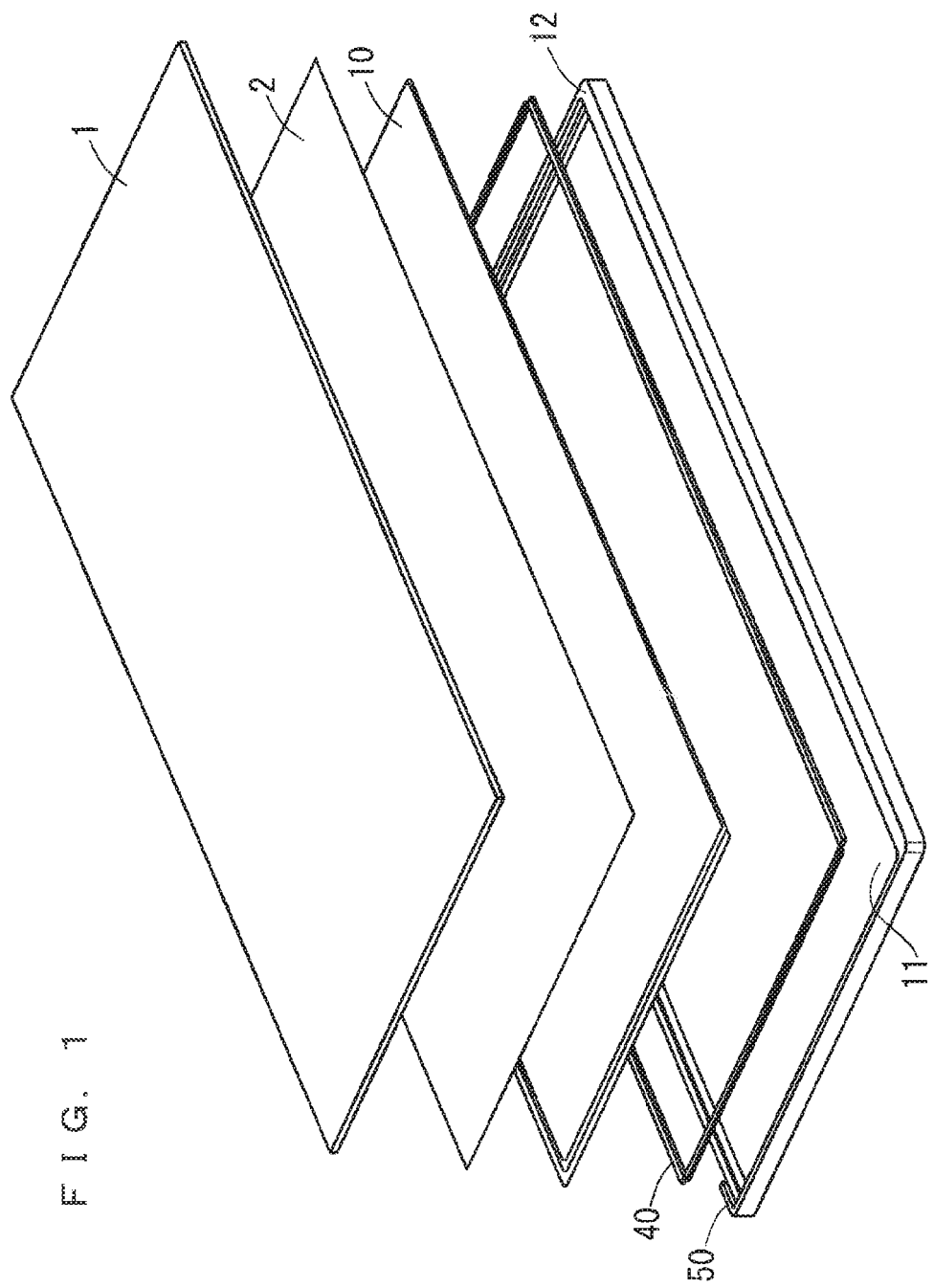
FIG. 1 is an exploded perspective view of a display device according to Embodiment 1.

Embodiment 1 according to the present invention will be described hereinafter with reference to the drawings. FIG. 1 is an exploded perspective view of a display device according to Embodiment 1. FIG. 2 is a cross section of an end portion of the display device according to Embodiment 1.

As illustrated in FIGS. 1 and 2, the display device includes a protective plate 1, a transparent resin 2, a display panel 10, a cushion 40 serving as a support, a backlight unit 11, and a first frame 12 and a second frame 13 serving as frames.

The display panel 10 is a display panel in the in-plane switching mode or the fringe-field switching mode. The protective plate 1 is disposed on the front surface of the display panel 10 through the transparent resin 2. The backlight unit 11 is disposed opposite to the display surface of the display panel 10. The first frame 12 is shaped into a rectangular frame to hold the front portion and the side portions of the backlight unit 11. The second frame 13 is depressed with the front portion opened to hold the side portions and the back portion of the backlight unit 11. The first frame 12 and the second frame 13 form a case for housing the backlight unit 11.

The display panel 10 includes a thin-film transistor (TFT) substrate 8, a counter substrate 7, and polarizing plates 6 and 9. The display panel 10 has a structure in which the TFT substrate 8 is affixed to the counter substrate 7 facing the TFT substrate 8, liquid crystals are injected between the counter substrate 7 and the TFT substrate 8, and the polarizing plates 6 and 9 are affixed to the front surface of the counter substrate 7 and the back surface of the TFT substrate 8, respectively. Here, the TFT substrate 8 includes a circuit portion of pixels including a TFT, and the counter substrate 7 includes, for example, a color filter and a counter electrode of pixels.

The second frame 13 is made of a metal or a resin. The second frame 13 is disposed on the back surface of the backlight unit 11 to house and hold the side portions and the back portion of the backlight unit 11. The first frame 12 is made of a metal or a resin, and includes an opening 20, a sidewall 12a, a panel facing portion 12b, and a protruding portion 50. The first frame 12 is disposed on the front surface side of the backlight unit 11, houses the backlight unit 11 in a state where the backlight unit 11 is housed in the second frame 13, and holds the front portion and the side portions of the backlight unit 11.

The first frame 12 houses the display panel 10 more forward than the portion of the first frame 12 in which the backlight unit 11 is housed. The protective plate 1 is attached to the front surface side of the counter substrate 7. Specifically, the protective plate 1 is affixed with the transparent resin 2 to the polarizing plate 6 disposed on the front surface of the counter substrate 7. A touch panel may be affixed to the polarizing plate 6 with the transparent resin 2 as a replacement for the protective plate 1.

The sidewall 12a is shaped into a rectangular frame so that the side surfaces of the backlight unit 11 can be covered to form the opening 20 through which the backlight unit 11 is seen. The opening 20 is formed to have the same size as the light-emitting region of the backlight unit 11. The panel facing portion 12b extends toward the opening 20 side from the sidewall 12a around an entire perimeter of the sidewall 12a to cover the end portion of the backlight unit 11.

The cushion 40 is disposed on the periphery of the opening 20 at the panel facing portion 12. The cushion 40 is shaped into a rectangular frame. The cushion 40 is affixed to the panel facing portion 12b with a double-faced tape to support the display panel 10 and the backlight unit 11 in between.

In the display panel 10 in the in-plane switching mode or the fringe-field switching mode, the liquid crystal molecules in a liquid crystal layer are oriented transversely or diagonally with respect to the display surface. With application of the pressure on the display surface of a display region, the liquid crystal molecules on a portion under the pressure are dispersed to cause light emission to improper direction. Thus, display inhomogeneity occurs to cause the display surface to be distorted. The display panel 10 is disposed so that the back surface of the display panel 10 abuts the tip of the cushion 40 fixed to the first frame 12 to prevent application of pressure to the display panel 10 when the display panel 10 is fixed.

The cushion 40 is made of an elastic material such as urethane, polyethylene, polyolefin, or a polyester form. The cushion 40 is set to be thick so that the front surface of the display panel 10 is disposed in the same position as or slightly more forward than the front end of the sidewall 12a of the first frame 12 when the display panel 10 is placed. Specifically, the thickness of the cushion 40 ranges from 0.3 mm to 1.5 mm, or is preferably approximately 1.0 mm.

The protruding portion 50 that protrudes from the panel facing portion 12b toward the display panel 10 side is formed in a connecting portion between the sidewall 12a and the panel facing portion 12b around the entire perimeter of the sidewall 12a and the panel facing portion 12b. The protruding portion 50 is made of a metal or a resin, similarly as the first frame 12. The protruding portion 50 is thinner than the cushion 40. A predetermined clearance is created between the tip of the protruding portion 50 and the display panel 10. The thickness X of the protruding portion 50 is set to satisfy a relationship of $A+X \geq B$, where A denotes the thickness of the display panel 10 and B denotes the thickness of the sidewall 12a of the first frame 12. Assuming that C denotes the thickness of the cushion 40, a relationship between X and C is represented by $C>X$ or preferably by $C/2 \geq X$. The thickness of the sidewall 12a is a thickness from the front end of the sidewall 12a to the tip of the protruding portion 50.

Since the cushion 40 is disposed between the display panel 10 and the first frame 12, the display panel 10 can maintain a non-deformed state with the cushion 40 compressed even when the force allowing the display panel 10 to be deformed is applied in fixing the display panel 10 to the first frame 12. Thus, display inhomogeneity does not occur even with the display panel 10 in the in-plane switching mode or the fringe-field switching mode disposed.

Since the protruding portion 50 is formed on the periphery of the cushion 40, the display panel 10 is not deformed with the elasticity of the cushion 40 until the protruding portion 50 comes in contact with the display panel 10, even with application of the force allowing the cushion 40 to be compressed. Upon contact with the protruding portion 50, the display panel 10 is supported by the protruding portion 50 to stop the position of the display panel 10 from being changed anymore. Even when the protective plate 1 is affixed to the front surface of the display panel 10, it is possible to prevent defects such as an affixing defect or trapping of bubbles due to insufficient pressing pressure.

After the protective plate 1 is affixed, the cushion 40 is compressed with application of a force to the display panel 10 to cause the display panel 10 to be sunk toward the backlight unit 11. However, the force allowing the protective plate 1 to come off is not generated because the front surface of the display panel 10 does not sink more backward than the front surface of the sidewall 12a. Thus, it is possible to prevent the protective plate 1 from coming off from the display panel 10 and the defects such as bubbles trapped between the protective plate 1 and the display panel 10.

As described above in the display device according to Embodiment 1, the cushion 40 is disposed on the panel facing portion 12b, the protruding portion 50 is thinner than the cushion 40, and a predetermined clearance is created between the tip of the protruding portion 50 and the display panel 10.

When the protective plate 1 or a touch panel is affixed to the front surface of the display panel 10, the protruding portion 50 supports the display panel 10 with the cushion 40 compressed. Thus, the pressing pressure little changes the position of the display panel 10. Consequently, it is possible to prevent any bubbles from being trapped between the protective plate 1 or the touch panel and the display panel 10. With prevention of the trapping of bubbles, the protective plate 1 or the touch panel can be uniformly affixed to the display panel 10, which can prevent occurrence of display inhomogeneity.

With the cushion 40 disposed on the periphery of the opening 20 and the protruding portion 50 formed on the sidewall 12a, increase in the rigidity in the protruding portion 50 can further prevent the pressing pressure from changing the position of the display panel 10.

The display panel 10 includes the TFT substrate 8 and the counter substrate 7 facing the TFT substrate 8, and the display device further includes the protective plate 1 attached to the front surface side of the counter substrate 7. Thus, the protective plate 1 can prevent the display panel 10 from being scratched.

Embodiment 2

Figure 3:
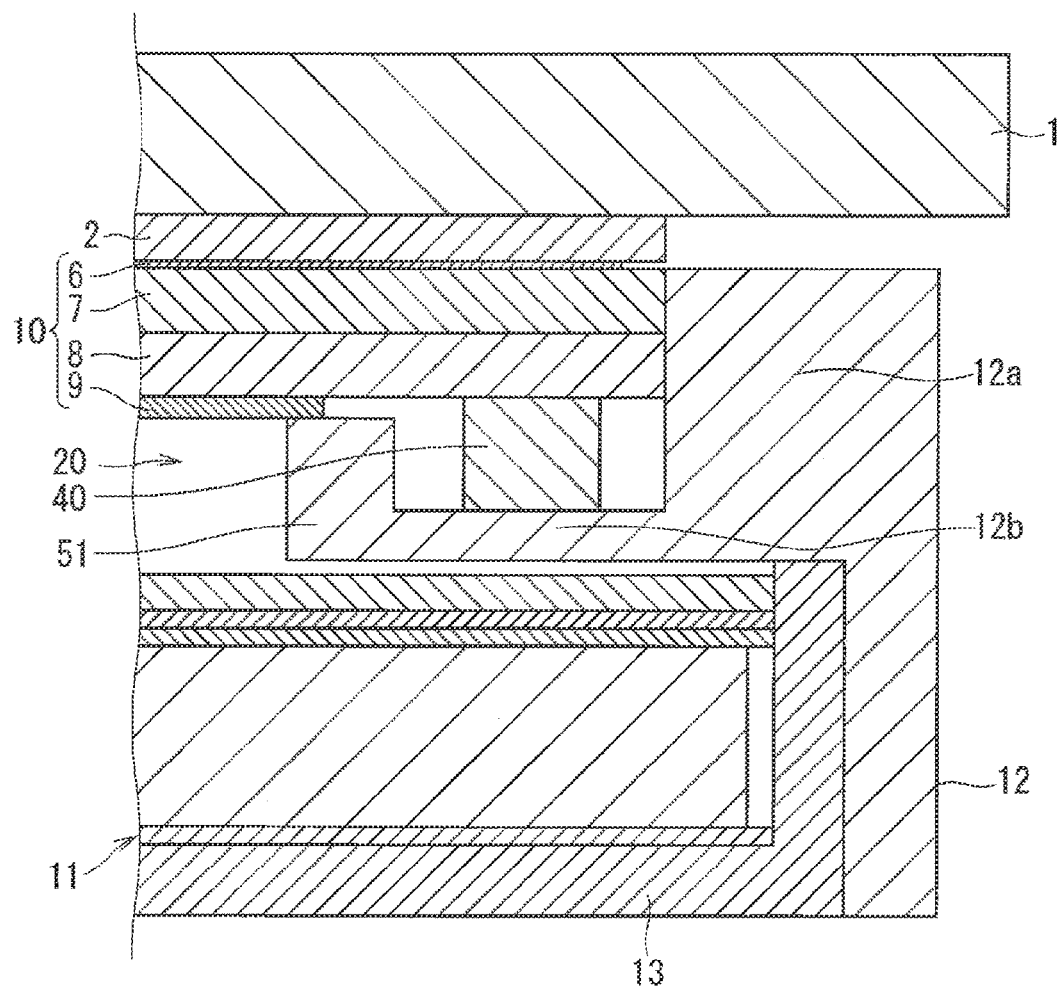
FIG. 3 is a cross section of an end portion of a display device according to Embodiment 2.

Next, a display device according to Embodiment 2 will be described. FIG. 3 is a cross section of an end portion of the display device according to Embodiment 2. In Embodiment 2, the same reference numerals will be assigned to the same constituent elements as those described in Embodiment 1, and the description thereof will be omitted.

As illustrated in FIG. 3, the cushion 40 is disposed on the periphery of the sidewall 12a, and a protruding portion 51 is formed on the periphery of the opening 20 according to Embodiment 2. Specifically, the cushion 40 is disposed at a predetermined spacing from the sidewall 12a of the panel facing portion 12b. The protruding portion 51 is formed at the end portion of the panel facing portion 12b. A predetermined clearance is created between the tip of the protruding portion 51 and the display panel 10.

As described above in the display device according to Embodiment 2, the cushion 40 is disposed on the periphery of the sidewall 12a, and the protruding portion 51 is formed on the periphery of the opening 20.

Thus, when the cushion 40 is affixed to the first frame 12, it is possible to prevent the cushion 40 from extending off from the opening 20 of the backlight unit 11. Thus, the cushion 40 does not shield the light emitted from the backlight unit 11, thus obtaining a luminance distribution uniform in the display region.

Other Modifications

Although Embodiments 1 and 2 describe the structures of providing the protruding portions 50 and 51, respectively, around the entire perimeter of the panel facing portion 12b of the first frame 12, the protruding portions 50 and 51 may be partially formed on the panel facing portion 12b of the first frame 12. Each of four sides of the panel facing portion 12b may have at least one of the protruding portions 50 and 51.

Although Embodiments 1 and 2 describe that the cushion 40 is shaped into a rectangular frame, the cushion 40 may be fixed on the panel facing portion 12b of the first frame 12 while being divided into plural portions.

Within the scope of the present invention, Embodiments can be freely combined, and each of Embodiments can be appropriately modified or omitted.

While the invention has been shown and described in detail, the foregoing description is in all aspects illustrative and not restrictive. It is therefore understood that numerous modifications and variations can be devised without departing from the scope of the invention.

What is claimed is:

1. A display device, comprising:
   a display panel;
   a backlight unit disposed opposite to a display surface of the display panel;
   a support supporting the display panel, the support being arranged between the display panel and the backlight unit, the support being made of an elastic material; and
   a frame-shaped frame holding a front portion and side portions of the backlight unit,
   the frame including (i) an opening through which the backlight unit is seen, (ii) a sidewall covering side surfaces of the backlight unit to form the opening, (iii) a panel facing portion extending from the sidewall toward the opening side to cover an end portion of the backlight unit, and (iv) a protruding portion protruding from the panel facing portion toward the display panel side,
   wherein the support is disposed on the panel facing portion,
   the support is in direct contact with the display panel,
   the protruding portion is thinner than the support, and
   a predetermined clearance is created between a tip of the protruding portion and the display panel such that where a thickness of the support is C and a thickness of the protruding portion is X, a relationship $C/2 \geq X$ is met.

2. The display device according to claim 1,
   wherein the support is disposed on a periphery of the opening, and
   the protruding portion is formed on the sidewall.

3. The display device according to claim 1,
   wherein the support is disposed on a periphery of the sidewall, and
   the protruding portion is formed on a periphery of the opening.

4. The display device according to claim 1,
   wherein the display panel includes a thin-film transistor substrate, and a counter substrate facing the thin-film transistor substrate, and
   the display device further comprises a protective plate attached to a front surface side of the counter substrate.

* * * * *